(12) United States Patent
Duarte

(10) Patent No.: US 8,024,869 B2
(45) Date of Patent: Sep. 27, 2011

(54) DIGITAL SIZING TOOL

(76) Inventor: Leo Duarte, Hesperia, CA (US)

( * ) Notice: Subject to any disclaimer, the term of this patent is extended or adjusted under 35 U.S.C. 154(b) by 0 days.

(21) Appl. No.: 12/624,640

(22) Filed: Nov. 24, 2009

(65) Prior Publication Data

US 2011/0119946 A1    May 26, 2011

(51) Int. Cl.
*G01B 5/00* (2006.01)
(52) U.S. Cl. .................. 33/784; 33/783; 33/793
(58) Field of Classification Search .............. 33/783, 33/784, 793, 797, 806
See application file for complete search history.

(56) References Cited

U.S. PATENT DOCUMENTS

| | | | | |
|---|---|---|---|---|
| 2,634,505 A * | 4/1953 | Petch | ............................ | 33/797 |
| 3,140,546 A * | 7/1964 | Bartlett | ............................ | 33/800 |
| 4,034,477 A * | 7/1977 | Von Voros | .................. | 33/784 |
| 4,127,112 A * | 11/1978 | Sherlock et al. | .............. | 33/512 |
| 4,233,743 A * | 11/1980 | Flick | ............................ | 33/512 |
| 4,265,021 A * | 5/1981 | Campbell | ..................... | 33/783 |
| 4,315,372 A * | 2/1982 | Kinkead | ......................... | 33/798 |
| D268,254 S * | 3/1983 | Caldwell et al. | ............. | D10/73 |
| 5,154,003 A * | 10/1992 | Moore | ........................ | 33/558.01 |
| 5,249,366 A * | 10/1993 | Takahashi et al. | .............. | 33/811 |
| 5,319,860 A * | 6/1994 | Pocci | ............................ | 33/797 |
| 5,428,903 A * | 7/1995 | Pocci | ............................ | 33/797 |
| 5,430,954 A * | 7/1995 | Best et al. | ..................... | 33/793 |
| 5,454,175 A * | 10/1995 | Li | ................................ | 33/797 |
| 6,105,269 A * | 8/2000 | Kondrat | ........................ | 33/512 |
| 6,272,762 B1 * | 8/2001 | Kinast et al. | ................... | 33/550 |
| 6,497,051 B1 * | 12/2002 | Poole et al. | .................... | 33/784 |
| 6,508,012 B2 * | 1/2003 | Wells, Jr. | ....................... | 33/784 |
| 6,543,151 B2 * | 4/2003 | Smola | ........................ | 33/555.1 |
| 6,739,068 B1 * | 5/2004 | Rinner | ........................... | 33/783 |
| 6,829,839 B2 * | 12/2004 | Killough | ........................ | 33/784 |
| 7,013,763 B2 * | 3/2006 | Hsien | ............................ | 81/165 |
| 7,246,450 B1 * | 7/2007 | Mason | .......................... | 33/784 |
| 7,347,002 B2 * | 3/2008 | Foege | ........................... | 33/783 |
| 2002/0178599 A1 * | 12/2002 | Smola | ........................ | 33/555.1 |
| 2007/0089315 A1 * | 4/2007 | Foege | .......................... | 33/783 |

* cited by examiner

*Primary Examiner* — Yaritza Guadalupe
(74) *Attorney, Agent, or Firm* — Jerry D. Haynes; The Law Office of Jerry D. Haynes

(57) ABSTRACT

A digital sizing tool for obtaining tooling measurements and requirements comprising: a pair of fingers, where said fingers are adjoined at one adjoined end and create an opening at the opposite end; a flexible resilient means, where the flexible resilient means adjoins the pair of fingers; and a digital readout, where said digital readout provides a means to display a measured distance between the pair of fingers at the opening end and the digital readout attached to a measurement rod, where said measurement rod extends between the pair of fingers. In one exemplary embodiment, each finger may include at least one gripping surface. In another particular embodiment, the flexible resilient means includes a piston and spring assembly.

8 Claims, 1 Drawing Sheet

DIGITAL SIZING TOOL

BACKGROUND OF THE INVENTION

1. Field of Invention

The present invention relates to a sizing tool that assists in determining tool size requirements.

2. Description of Related Art

Many times a mechanic or even a home repair person may need to determine proper tool size for a nut or bolt that is part of a mechanical repair. Some mechanics simply use a trial and error method in determining the proper fitting for a wrench or a nut attachment that is needed to either unloosen or tighten the nut or bolt. This trial and error method takes time and also requires movement back and forth to a toolbox. Depending on the circumstances and environment, a mechanic may be working in a tight position or have to ascend a ladder in order to perform the job. Accordingly, it is advantageous for the mechanic to have a suitable determination of the tool size that is needed to complete the job without resorting to trial and error. Furthermore, some mechanics rely on a visual determination of bolt measurements however this method may also be ineffective, where various sizes of bolts and nuts may exist within the equipment, engine or device being worked upon. Either method is time-consuming and often leads to wasted time and effort in order to perform the job function.

Some measuring devices have been created to provide a bolt size determination where a mechanic may use a template made of paper, cardboard, plastic or metal in order to measure the bolt size. One drawback to using templates is that many templates are exclusively for either standard bolt sizes or metric bolt sizes. Therefore the mechanic may need templates for both sizing parameters and then have them readily accessible to do the sizing as needed.

U.S. Pat. No. 5,875,558 discloses a measuring tool that includes a plurality of templates, where each template has a socket opening and provides a sizing mechanism to determine socket or bolt size. Another example of a measuring device is U.S. Pat. No. 4,908,955 which discloses a tool adapted to be manipulated singlehandedly for providing a direct reading of the size of small objects in particular nuts and bolt heads, where the tool includes a pair of tongs that are activated by a thumb slide.

U.S. Pat. No. 6,508,012 discloses a digital fastener size indicator that includes a fixed jaw that extends from the end of the housing where a movable jaw extends from the end of the housing adjacent to and parallel with the fixed jaw. A digital electrical length measuring circuit within the housing is connected to the movable jaw. The fastener size indicator of the '012 patent provides a digital readout of the bolt size position between the jaws.

Although some electronic sizing tools have been noted in the prior art further development of sizing tool indicators is substantially needed. In particular a sizing tool that includes multiple controls and capable of providing sizing for both standard and metric sized bolts is therefore needed.

SUMMARY OF THE INVENTION

The present invention relates to a digital sizing tool for obtaining tooling measurements and requirements comprising: a pair of fingers, where said fingers are adjoined at one adjoined end and create an opening at the opposite end; a flexible resilient means, where the flexible resilient means adjoins the pair of fingers; and a digital readout, where said digital readout provides a means to display a measured distance between the pair of fingers at the opening end and the digital readout attached to a measurement rod, where said measurement rod extends between the pair of fingers. In one exemplary embodiment, each finger may include at least one gripping surface. In another particular embodiment, the flexible resilient means includes a piston and spring assembly, where the flexible resilient means includes a first piston and spring assembly, where the first piston and spring assembly adjoins the fingers at one end; and a second piston and spring assembly, where the second piston and spring assembly adjoin the fingers at a midpoint of the fingers.

DETAILED DESCRIPTION

Figure 1:
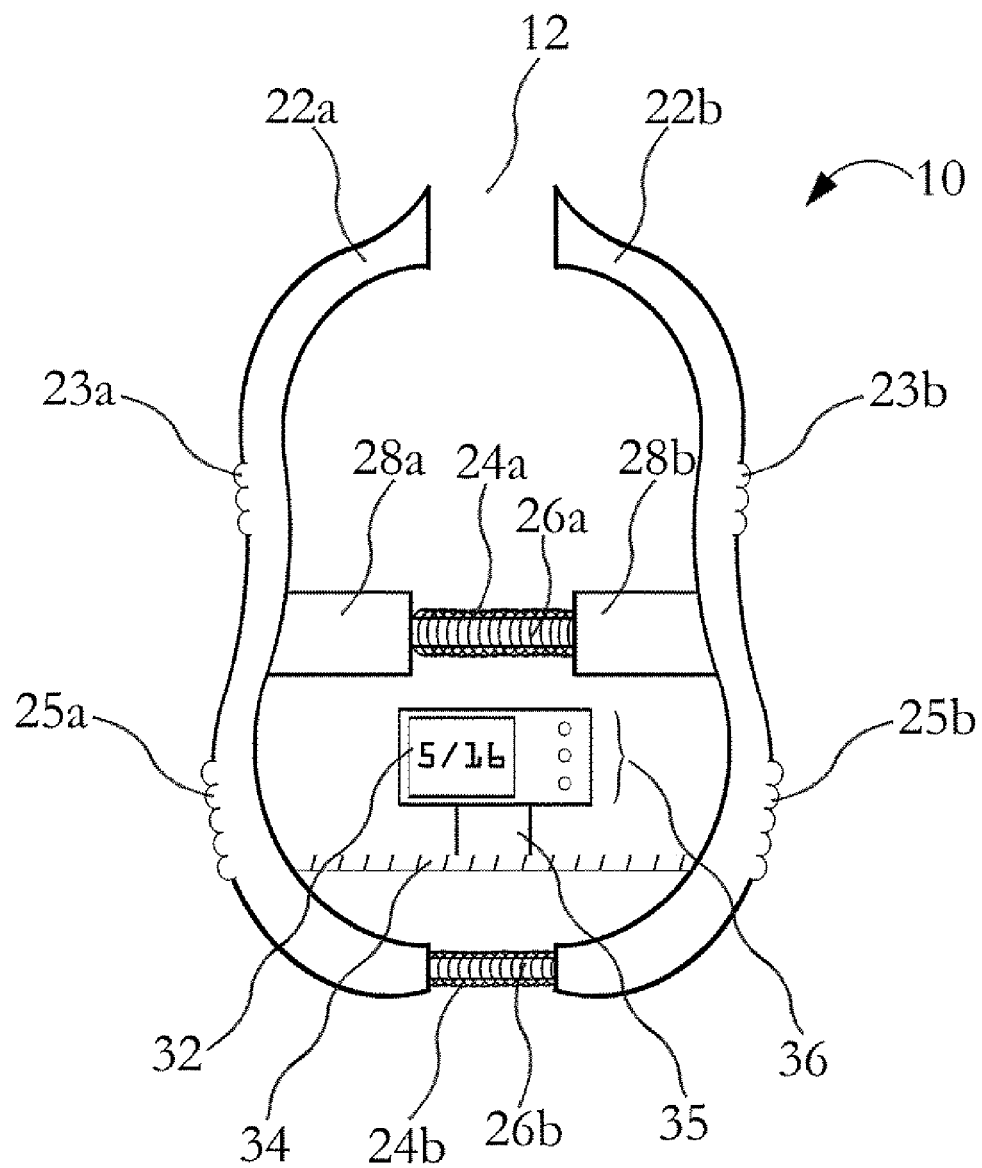
FIG. 1 depicts a digital sizing tool according to the present invention.

The present inventions relates to a digital sizing tool utilized by a mechanic to acquire the size of a bolt or a nut. The digital sizing tool according to the present invention enables the mechanic to size multiple bolts or nuts quickly and easily and works effectively on either standard or metric size nuts and bolts. The digital sizing tool includes suitable control mechanisms in order to enable the mechanic to size out the required tools for a particular job.

FIG. 1 depicts a digital sizing tool 10 according to the present invention. The digital sizing tool 10 includes two outer fingers 22a, 22b that extend the entire length of the sizing tool 10. Between the outer fingers 22a, 22b lies a opening 12. When using the digital sizing tool 1, a mechanic positions the nut and bolt between the opening 12 and applies pressure to the outer fingers 22a, 22b in order to obtain a sizing of the nut or bolt.

Other components of the digital sizing tool 10 include digital readout 32 that provides a digital readout of the size of a nut or bolt in standard or metric sizing. Along the outer surface of the outer fingers 22a, 22b are two parallel and opposite gripping surfaces, gripping surface 23a, 23b are near or proximal to the opening 12 and gripping surfaces 25a, 25b are distal from opening 12 and positioned close to the digital readout area. The two outer fingers 22a, 22b are joined by piston and spring assemblies which create flexibly resilient attachment points. In particular, piston 26b and spring 24b join the outer fingers at an end opposite to the opening 12. At the approximate midpoint of the outer fingers 22a, 22b, two finger brackets 28a, 28b extend inwardly on the inner perimeter between the outer fingers 22a, 22b and are joined by piston 26a and spring 25a. The piston spring assemblies enable to opening 12 to remain in a normally open position. When a user desires to take a measurement, then the piston spring assemblies may be compressed so that the opening 12 closes upon the object nut or bolt for measurement.

Below the finger brackets 28a, 28b lies a digital readout 32 that includes control buttons 36. The control buttons 36 provide a means to control the mode and quantity of readings that are being recorded by the digital readout 32. The control buttons 36 also includes a reset button as part of the control mechanisms. While being used, a mechanic may elect to receive either metric or standard readings and indicate the number of readings that are being taken with the control buttons. These readings are then stored in memory residing in the digital readout and equip the mechanic with the necessary knowledge to select the correct tools for a particular job or equipment that may be being worked on at the time. The digital readout 32 is mounted upon a readout mount 35 that is on top of a measurement rod 34 that extends in between the outer fingers 22a, 22b.

The mechanic may grip the sizing tool 10 at either gripping surface provided along the outer fingers 22a, 22b and apply sufficient pressure to close the opening 12 upon the bolt or nut being measured. Use of the sizing tool 10 according to the present invention provides a means for a mechanic to work more efficiently and reduces the amount of trips to a toolbox that are required to complete a job. Once all the measurements have been taken they may be stored within memory residing in the digital readout 32 and provide the mechanic with the necessary information to obtain the tools to complete his job. The sizing tool 10 provides a measuring tool for both standard and metric size wrenches or sockets that may be used by a mechanic. The sizing tool is portable and may be placed in a mechanic's pocket to use when needed. The digital readout and measuring device include an internal power source such as a battery in order to supply power to the digital readout and to record the readings that are taken with the digital sizing tool. The instant invention has been shown and described in what it considers to be the most practical and preferred embodiments. It is recognized, however, that departures may be made there from within the scope of the invention and that obvious modifications will occur to a person skilled in the art.

What is claimed is:

1. A digital sizing tool for obtaining tooling measurements and requirements comprising:
   a. a pair of fingers, where said fingers are adjoined at one adjoined end and create an opening at the opposite end;
   b. a flexible resilient means, where the flexible resilient means adjoins the pair of fingers and said flexible resilient means includes a first piston and spring assembly, where said first piston and spring assembly adjoins the fingers at one end and a second piston and spring assembly, where said second piston and spring assembly adjoin the fingers at a midpoint of the fingers; and
   c. a digital readout, where said digital readout provides a means to display a measured distance between the pair of fingers at the opening end and the digital readout attached to a measurement rod, where said measurement rod extends between the pair of fingers and where said digital readout displays at least one of a metric reading and a standard reading.

2. The digital sizing tool according to claim 1, where each finger includes at least one gripping surface.

3. The digital sizing tool according to claim 1, where said second piston and spring assembly is mounted between two finger brackets where one bracket extends from each finger.

4. The digital sizing tool according to claim 1, where said digital readout includes control buttons.

5. The digital sizing tool according to claim 4, where said control buttons provide a means to control the mode and quantity of measurement readings.

6. The digital sizing tool according to claim 5, where said means to control the mode and quantity of measurement readings elects between the metric reading and the standard reading to display on said digital readout.

7. The digital sizing tool according to claim 1, where said digital readout includes a power source and memory.

8. The digital sizing tool according to claim 7, where said power source includes a battery.

* * * * *